Patented Nov. 21, 1944

2,363,011

UNITED STATES PATENT OFFICE 2,363,011

CATALYTIC DEMURIATION

John C. Michalek and Edwin R. Erickson, Niagara Falls, N. Y., assignors to The Mathieson Alkali Works, Inc., New York, N. Y., a corporation of Virginia No Drawing. Application September 3, 1942, Serial No. 457,194

14 Claims. (Cl. 260—650)

This invention relates to catalysis of reactions in which hydrogen halides are removed from halogen-bearing organic compounds. More particularly, the invention contemplates improved catalysts and improvements in the demuriation of a variety of halogen-bearing organic compounds, the term "demuriation" being employed to include the removal of halogen acids generally.

It has been proposed heretofore to obtain unsaturated organic compounds by demuriation. Thus, it has been proposed to obtain olefins through the demuriation of aliphatic compounds, cyclo-aliphatic compounds and aromatic compounds having aliphatic side chains. However, many of these reactions have been impracticable because suitable catalysts have not been available. A suitable catalyst must of course be effective in catalyzing the desired reaction, but in addition should have the following characteristics:

(a) Activity at a relatively low temperature in order to avoid polymerization of the product;

(b) Freedom from components that tend to volatilize and contaminate the product;

(c) The ability to demuriate large quantities of the halogenated compounds without losing its activity;

(d) The ability to demuriate exclusively without catalyzing other reactions, especially pyrolysis; and (e) The ability to be easily and rapidly regenerated to its original activity.

Moreover, for commercial purposes, a demuriation catalyst should be such that it is easily and cheaply prepared and used.

The requirements for a catalyst are especially severe in demuration of side chain halogenated ethyl benzene, homologues of ethyl benzene and ring-halogenated ethyl benzenes which have side chains containing halogen. The products of such demuriations, for example, ring-dichlorostyrenes polymerize readily and become discolored and unsatisfactory unless the catalyst is suitable. Thus, catalysts heretofore proposed for demuriating chloroethyl dichlorobenzenes and chloroethyl trichlorobenzenes to produce nuclear dichlorostyrene and trichlorostyrenes have tended to produce polymerized and discolored products.

As the result of our investigations, we have developed catalysts which meet all of the foregoing requirements and which may be employed advantageously for demuriating a variety of halogen-bearing organic compounds, including aliphatic compounds, cyclo-aliphatic compounds, and aromatic compounds having aliphatic side chains. The catalysts of our invention meet the severe requirements imposed in demuriating chloroethyl dichlorobenzenes and chloroethyl trichlorostyrenes and other compounds which, upon demuriation, result in products that are easily polymerized. Moreover, our catalysts are generally applicable for less exacting demuriations.

The catalysts of our invention comprise intimate mixtures of a phosphate of an alkaline earth metal, magnesium being included in this designation, with a phosphate of a metal of variable valence (i. e., a metal having more than one valence) and particularly a metal of variable valence of series 4 of the periodic table—for example cobalt, chromium and manganese.

The catalyst preferably is deposited on a suitable carrier which advantageously is an aluminum oxide or silicate, either natural or synthetic. Suitable carriers, include kaolin, porcelain, Florida earth and the like.

In some instances, it may be desirable to employ in the catalyst the phosphates of two or more metals of variable valence. Thus, the catalyst may comprise a mixture of magnesium phosphate with cobalt phosphate, or a mixture of barium phosphate with cobalt phosphate and chromium phosphate. If the phosphate of only one metal of variable valence is present, it is desirable to employ about 2 moles of alkaline earth phosphate to each mole of phosphate of the metal. If two metal phosphates are present, it is desirable to employ about two moles of the alkaline earth metal phosphate to one mole of the first metal phosphate and one mole of the second metal phosphate. By way of example, a suitable catalyst may comprise two moles of magnesium phosphate to one mole of cobalt phosphate or two moles of magnesium phosphate to one mole of cobalt phosphate and one mole of manganese phosphate.

Although the foregoing proportions may be considered as optimum, other proportions may be employed with satisfactory results.

The catalysts of our invention are remarkably effective in promoting demuriation. In the removal of aliphatic-bound halogen, conversion to the desired product may amount to 98% or better.

Our catalysts are active at relatively low temperature and may be used effectively at temperatures from 300° C. to 400° C. for the removal of aliphatic halogen. For the demuration of less stable materials even lower temperatures may be used although higher temperatures may be required for some relatively refractory halogen-bearing organic compounds.

In demuriating trichlorobenzenes to form nuclear dichlorostyrenes, the catalysts of our invention are effective at temperatures as low as 300° C. and may also be used at temperatures at 450° C. or higher, although for this particular reaction it is advantageous to operate in the range of about 370° C. to 420° C. at pressures in the range of 10 to 100 mm. Hg. The fact that our catalysts are active at low temperatures tends to avoid undesired side reactions, so that almost no by-products are formed.

Because of the unusual activity of the catalysts, contact times for demuriation may be very low. This is an important advantage since in the short contact time undesired decompositions are avoided. Generally speaking, contact times may be substantially less than 1 second and may even be less than 0.1 second.

The catalysts are long lived and may be employed to demuriate surprisingly large amounts of charge without loss in activity. Moreover, when the conversion rate begins to decrease, thus indicating a decrease in activity, the catalysts may be regenerated readily by heating in air or other oxygen-bearing gas. For example, the catalysts are readily regenerated by heating in a stream of air at a temperature of about 500° C. The catalysts are rugged and may be heated to temperatures of 625° C. or somewhat higher without injury. After many regenerations, the catalysts retain their original efficiency. Lastly, the catalysts are cheaply and easily prepared.

Nitrogen or other inert gas may be employed advantageously to carry vapors of the compound to be demuriated over the catalyst.

The following illustrate presently preferred examples of the preparation and use of our catalysts:

Catalyst 1

A catalyst was prepared by dissolving 260 parts of barium nitrate (anhydrous), 200 parts of chromium nitrate $Cr(NO_3)_3.9H_2O$ and 145 parts of cobalt nitrate $Co(NO_3)_2.6H_2O$ in 3000 parts of warm water. To this solution was added 150 parts of syrupy phosphoric acid. An aluminum oxide (known to the trade as Alfrax) in the form of a coarse powder (8-mesh) was boiled in the resulting mixture for about 1 hr. and allowed to stand overnight. The impregnated oxide was then drained free of liquid, dried at 110° C. and charged to a catalyst chamber where final drying was accomplished by heating to 400° C. in a vacuum.

Catalyst 2

A second catalyst was prepared from an aqueous solution containing 1 mole of magnesium nitrate, 0.5 mole of cobalt nitrate, and 0.5 mole of chromic nitrate. Twenty percent excess of metaphosphoric acid was dissolved separately and added to the nitrate solution. Aluminum oxide powder of the same kind and size as that employed in the manufacture of Catalyst 1 was then boiled in the solution. After all the air had been expelled from the powder and the solution, the mixture was allowed to cool and the treated powder was removed and ignited.

Demuriation 1

Catalyst 1 was heated to a temperature of 370 to 400° C. while trichloroethylbenzene with 1 chlorine in the side chain and 2 in the ring was vaporized over the catalyst at a pressure of 21 to 35 mm. Hg. With the exception of a small first fraction, the product of the demuriation was water-white and had an index of refraction $N_D^{25°}$ of about 1.5775 to 1.5809. The product was a good grade of nuclear dichlorostyrene, for the various isomers of dichlorostyrene having both chlorine atoms in the ring show refractive indices of 1.5770 to 1.5838.

Demuriation 2

After Catalyst 1 had been employed to demuriate 700 grams of trichloroethylbenzene to dichlorostyrene, it was regenerated by burning clean in air at about 500° C. The regenerated catalyst was then employed to convert trichloroethylbenzene to dichlorostyrene at a temperature of 400° C. to 417° C. and at a pressure of 29 mm. Hg. The regenerated catalyst was quite as effective as the original material.

Demuriation 3

Catalyst 2 was employed to demuriate trichloroethylbenzene, the temperature of operation being 395 to 412° C. and the pressure being 20 mm. Hg. The resulting dichlorostyrene was of high quality with a refractive index $N_D^{25°}$ ranging from 1.5790 to 1.5795.

Demuriations 4, 5, 6 and 7

The following tests show that with the catalysts of our invention temperatures as low as 300° C. are adequate to bring about complete demuriation of the aliphatic halogen in trichloroethylbenzene. In the following instances, Catalyst 2 was employed at the temperatures indicated and resulted in nuclear dichlorostyrene having the following indices of refraction:

| Temperature of demuriation | $N_D^{25°}$ |
| --- | --- |
| 355 | 1.5800 |
| 336–322 | 1.5799 |
| 313–310 | 1.5798 |
| 302–305 | 1.5794 |

In all instances, the products of the demuriation were water-white.

Demuriation 8

Trichloroethylbenzene in the amount of 365 grams was passed over Catalyst 2 at a temperature of 372° C. to 398° C. The index of refraction $N_D^{25°}$ of the product was 1.5789 to 1.5798. Analysis showed that all but .88% chlorine had been removed from the side chain. In other words, all but about 5% of the side chain chlorine had been removed, indicating that the demuriation was about 95% complete.

Demuriation 9

Trichloroethylbenzene was passed over Catalyst 1 at a temperature of 384° C. to 401° C. to produce a nuclear dichlorostyrene that was substantially pure, as indicated by an index of refraction $N_D^{25°}$ of 1.5768 to 1.5778 and a side chain chlorine content of only .03% for the product.

Demuriation 10

In this case, the catalyst was similar to Catalyst 2 and was similarly prepared except that 4-mesh aluminum oxide was employed. Sufficient catalyst to fill a catalyst chamber of about 100 cu. in. capacity was employed over a period of months in the demuriation of trichloroethylbenzene to nuclear dichlorostyrene. During the period of operation the catalyst was regenerated approximately 150 times and operated after these regenerations with its original efficiency.

We claim:

1. In the demuriation of halogen-bearing organic compounds, the improvement which comprises conducting the demuriation in the presence of a catalyst comprising an intimate mixture of a phosphate of alkaline earth metal with the phosphate of a metal of variable valence of Series 4 of the periodic table.

2. In the demuriation of halogen-bearing organic compounds, the improvement which comprises conducting the demuriation in the presence of a catalyst comprising an intimate mixture of a phosphate of alkaline earth metal with a phosphate of cobalt.

3. In the demuriation of halogen-bearing organic compounds, the improvement which comprises conducting the demuriation in the presence of a catalyst comprising an intimate mixture of a phosphate of alkaline earth metal with a phosphate of chromium.

4. In the demuriation of halogen-bearing organic compounds, the improvement which comprises conducting the demuriation in the presence of a catalyst comprising an intimate mixture of a phosphate of alkaline earth metal with a phosphate of manganese.

5. In the demuriation of halogen-bearing organic compounds, the improvement which comprises conducting the demuriation in the presence of a catalyst comprising an intimate mixture of a phosphate of alkaline earth metal with the phosphate of a metal of variable valence of Series 4 of the periodic table, the molar ratio of the phosphate of the alkaline earth metal to the phosphate of the metal of variable valence being about 2:1.

6. In the demuriation of halogen-bearing organic compounds, the improvement which comprises conducting the demuriation in the presence of a catalyst comprising an intimate mixture of a phosphate of alkaline earth metal with the phosphates of at least 2 polyvalent metals.

7. In the demuriation of halogen-bearing organic compounds, the improvement which comprises conducting the demuriation in the presence of a catalyst comprising an intimate mixture of a phosphate of alkaline earth metal with the phosphates of at least 2 metals of variable valence selected from Series 4 of the periodic table.

8. In the demuriation of halogen-bearing organic compounds, the improvement which comprises conducting the demuriation in the presence of a catalyst comprising an intimate mixture of a phosphate of alkaline earth metal with the phosphates of at least 2 metals of variable valence selected from Series 4 of the periodic table, the phosphate being present in the molar ratio of about 2 alkaline earth phosphates to 1 phosphate of one metal of variable valence to 1 phosphate of the other metal of variable valence.

9. In the demuriation of halogen-bearing organic compounds, the improvement which comprises conducting the demuriation in the presence of a catalyst comprising an intimate mixture of a phosphate of alkaline earth metal with the phosphate of a metal of variable valence selected from Serial 4 of the periodic table, the phosphates being deposited on a carrier selected from the group consisting of aluminum oxides and aluminum silicates.

10. The process which comprises demuriating alkyl benzenes having side chains containing halogen in the presence of a catalyst comprising an intimate mixture of a phosphate of an alkaline earth metal with a phosphate of a metal of variable valence selected from the group consisting of cobalt, chromium and manganese.

11. The process which comprises demuriating chloroethyl dichlorobenzenes in the presence of a catalyst comprising an intimate mixture of a phosphate of an alkaline earth metal with the phosphate of a metal of variable valence selected from the group consisting of cobalt, chromium and manganese.

12. A demuriation catalyst which comprises an intimate mixture of a phosphate of an alkaline earth metal with a phosphate of a metal of variable valence selected from the group consisting of cobalt, chromium and manganese.

13. A demuriation catalyst comprising an intimate mixture of a phosphate of an alkaline earth metal with a phosphate of a metal of variable valence selected from the group consisting of cobalt, chromium, and managnese, the phosphate of the alkaline earth metal and the phosphate of the metal of variable valence being present in the molar ratio of about 2:1.

14. A demuriation catalyst comprising an intimate mixture of a phosphate of an alkaline earth metal and the phosphates of at least 2 metals of variable valence selected from the group consisting of cobalt, chromium and manganese, the catalyst containing about 1 mole of one metal of variable valence to 1 mole of the other metal of variable valence to 2 moles of the alkaline earth metal.

JOHN C. MICHALEK.
EDWIN R. ERICKSON.

CERTIFICATE OF CORRECTION.

Patent No. 2,363,011.  November 21, 1944.

JOHN C. MICHALEK, ET AL.

It is hereby certified that error appears in the printed specification of the above numbered patent requiring correction as follows: Page 1, first column, line 36, and second column, line 53, for "demuration" read --demuriation--; page 3, first column, line 39, beginning with "6. In the demuriation" strike out all to and including "metals." in line 44, comprising claim 6, and for the claims now numbered "7", "8", "9", "10", "11", "12", "13" and "14" read --6--, --7--, --8--, --9--, --10--, --11--, --12-- and --13-- respectively; in the heading to the specification, line 9, for "14 Claims" read --13 Claims--; and that the said Letters Patent should be read with this correction therein that the same may conform to the record of the case in the Patent Office.

Signed and sealed this 20th day of February, A. D. 1945.

Leslie Frazer (Seal)  Acting Commissioner of Patents.